US012567983B2

(12) United States Patent　　(10) Patent No.:　US 12,567,983 B2

Jespers et al.　　(45) Date of Patent:　Mar. 3, 2026

(54) VERIFICATION OF AUTHENTICITY OF A DATA SOURCE

(71) Applicant: NXP B.V., Eindhoven (NL)

(72) Inventors: Frieder Jonas Jespers, Hamburg (DE); Karsten Meisberger, Blomesche Wildnis (DE); Nikita Veshchikov, Brussels (BE); Marc Vauclair, Overijse (BE)

(73) Assignee: NXP B.V., Eindhoven (NL)

( * ) Notice: Subject to any disclaimer, the term of this patent is extended or adjusted under 35 U.S.C. 154(b) by 175 days.

(21) Appl. No.: 18/544,639

(22) Filed: Dec. 19, 2023

(65) Prior Publication Data

US 2025/0202718 A1　　Jun. 19, 2025

(51) Int. Cl.
*H04L 9/32*　　(2006.01)

(52) U.S. Cl.
CPC .......... *H04L 9/3268* (2013.01); *H04L 9/3213* (2013.01)

(58) Field of Classification Search
CPC . H04L 9/3268; H04L 9/3213; H04L 2209/60; H04L 9/3234; H04L 9/3265; H04L 9/3247
See application file for complete search history.

(56) References Cited

U.S. PATENT DOCUMENTS

| | | | |
|---|---|---|---|
| 5,748,763 | A | 5/1998 | Rhoads |
| 7,508,955 | B2 | 3/2009 | Carr et al. |

| | | | | |
|---|---|---|---|---|
| 8,515,124 | B2 | 8/2013 | Yoo et al. | |
| 8,741,713 | B2 | 6/2014 | Bruley et al. | |
| 9,245,173 | B2 | 1/2016 | Lee et al. | |
| 9,584,356 | B2 | 2/2017 | Gressus et al. | |
| 10,057,460 | B2 | 8/2018 | Dixit | |
| 2006/0036864 | A1 | 2/2006 | Parulski et al. | |
| 2017/0357967 | A1* | 12/2017 | Sykora | .................. H04L 63/083 |

(Continued)

FOREIGN PATENT DOCUMENTS

| | | |
|---|---|---|
| CN | 103279936 A | 9/2013 |
| CN | 20579307 U | 12/2016 |

(Continued)

OTHER PUBLICATIONS

Anonymous: "Instructions for Qualified Electronic Signatures (QES)"; Retrieved from the Internet: URL: https://commission.europa.eu/system/files/2023-03/Instructions%20for%20QES%20signature%20of%20documents.pdf (Mar. 1, 2023).

(Continued)

*Primary Examiner* — J. Brant Murphy

(57) ABSTRACT

A method is described for verification of authenticity of a data source. The method includes generating a key and receiving a digital certificate. The key may be a private key of a key pair, and the digital certificate may be a qualified e-signature (QES) certificate that is tied to the data source and generated by an electronic identification, authentication and trust services (eIDAS). Using the digital certificate and the key, creating a signature certificate. The signature certificate may be stored in a secure element of a recording device. The recording device receives a data stream that may comprise one or more of audio, video, photo, or other sensor data. The data stream is signed with the signature certificate. A public key of the key pair may then be used to verify that the data stream originated at the data source.

20 Claims, 3 Drawing Sheets

(56) References Cited

U.S. PATENT DOCUMENTS

| | | | |
|---|---|---|---|
| 2018/0026790 A1 | 1/2018 | Seo et al. | |
| 2018/0268380 A1 | 9/2018 | Bisbee et al. | |
| 2020/0159966 A1* | 5/2020 | Sibert | H04L 9/3247 |
| 2023/0344639 A1* | 10/2023 | Hojjati | H04L 9/3213 |

FOREIGN PATENT DOCUMENTS

| | | |
|---|---|---|
| GB | 2567703 B | 7/2022 |
| JP | 2019522840 A | 8/2019 |
| KR | 20110090731 A | 8/2011 |
| WO | 2010092407 A1 | 8/2010 |
| WO | 2016207899 A1 | 12/2016 |

OTHER PUBLICATIONS

European Telecommunications Standards Institute (ETSI); Electronic Signautres and Infrastructures (ESI); Policy and Security Requirements for Identity Proofing of Trust Services Subjects—ETSI Draft Specification, 119 461, No. v0.0.12; pp. 1-56; Retrieved from the Internet: URL: ftp://docbox.etsi.org/ESI/ESI/70-Drafts/0019461/ESI-0019461v0012.docs, retrieved on Jun. 29, 2021).

Liu, Yuxin (Myles), et al; "Vronicle Verifiable Provenance For Videos From Mobile Devices"; Proc. Of the 2022 Intl. Conf. on Management of Data, ACM Put27, New York, NY, USA; pp. 196-208 (Jun. 27, 2022).

Ali, Zulfiqar et al.; "An Automatic Digital Audio Authentication/ Forensics System"; IEEE Access ( vol. 5); Feb. 24, 2017; DOI: 10.1109/ACCESS.2017.2672681.

Bajpai, Jaya et al.; "A Literature Survey—Various Audio Watermarking Techniques and Their Challenges"; 2016 6th International Conference—Cloud System and Big Data Engineering (Confluence); Jan. 14-15, 2016, Noida, India; DOI: 10.1109/CONFLUENCE.2016.7508162.

BSI, Federal Office for Information Security; Schwalm, Steffen & Korte, Ulrike & Hühnlein, Detlef & Engel, Mario; "Basics of Digital Signature Techniques and Trust Services—Legal Framework, Technical Aspects"; Version 2.0; Apr. 18, 2023.

Federal Office for Security in Information Technology; Technical Guideline TR-03127: eID Cards with eID and eSign Application Based on Extended Access Control Identity Card and Electronic Residence Permit; Version 1.21; May 2, 2018 (With an English transation located, attached; Version 1.13; Mar. 10, 2011; https://www.bsi.bund.de/SharedDocs/Downloads/EN/BSI/EIDAS/German_eID_Whitepaper.pdf?_blob=publicationFile&v=1 ).

Federal Office for Security in Information Technology; Technical Report: Signature Creation and Administration for eIDAS Token; Part 1: Functional Specification; Version 1.0; Jul. 21, 2015.

Friedman, Gary L. "The Trustworthy Digital Camera: Restoring Credibility to the Photographic Image"; IEEE Transactions on Consumer Electronics ( vol. 39, Issue: 4, Nov. 1993); DOI: 10.1109/30.267415.

Friedman, Gary L.; NASA.gov Paper N94-32470; "The Trustworthy Digital Camera: Restoring Credibility to the Photographic Image"; 1994 pp. 430-435; From the Internet: https://ntrs.nasa.gov/api/citations/19940027964/downloads/19940027964.pdf.

Friedman, Gary L.; NTRS-NASA.gov Conference Paper, Document ID 19940027964, NASA Technical Reports; "The Trustworthy Digital Camera: Restoring Credibility to the Photographic Image"; NASA, Washington, Technology 2003: The Fourth National Technology Transfer Conference and Exposition, vol. 2; Published Feb. 1, 1994.

Salian, Isha; "NVIDIA: Stroke of Genius: GauGAN Turns Doodles into Stunning, Photorealistic Landscapes"; Mar. 18, 2019; https://blogs.nvidia.com/blog/gaugan-photorealistic-landscapes-nvidia-research/.

Ullah, Subhan et al.; "Smart Cameras with Onboard Signcryption for Securing IoT Applications"; 2017 Global Internet of Things Summit (GIoTS), Jun. 6-9, 2017, Geneva, Switzerland; DOI: 10.1109/GIOTS.2017.8016279.

Winkler, Thomas et al.; "TrustCAM: Security and Privacy-Protection for an Embedded Smart Camera Based on Trusted Computing"; 2010 7th IEEE International Conference on Advanced Video and Signal Based Surveillance, Aug. 29-Sep. 1, 2010, Boston, Massachusetts; DOI: 10.1109/AVSS.2010.38.

* cited by examiner

VERIFICATION OF AUTHENTICITY OF A DATA SOURCE

BACKGROUND

Field

This disclosure generally relates to authentication, and more particularly, to verification of the authenticity of a data source.

Related Art

Today's digital media landscape is more vulnerable to misinformation than ever before and with the continuing advancements of artificial intelligence (AI) tools for audio and video processing this problem will only accelerate in the future. For example, development of media editing tools such as Photoshop and the GNU Image Manipulation Program (GIMP) make it possible to create fake photo evidence. Other software provides the ability to perform similar manipulations with audio recordings. However, creating fake but plausible photo evidence still requires a lot of work from a professional if such a photo-editor is used. Using Machine Learning (ML), software can be created that can generate photo-realistic images and accurate human voice synthesis without much input from human operators.

A consequence of the use of media editing tools is that it becomes more difficult to distinguish between trustable media sources and malicious sources. One important aspect of this challenge is to be able to verify the authenticity of a data source as the cloning of media become yet more sophisticated.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
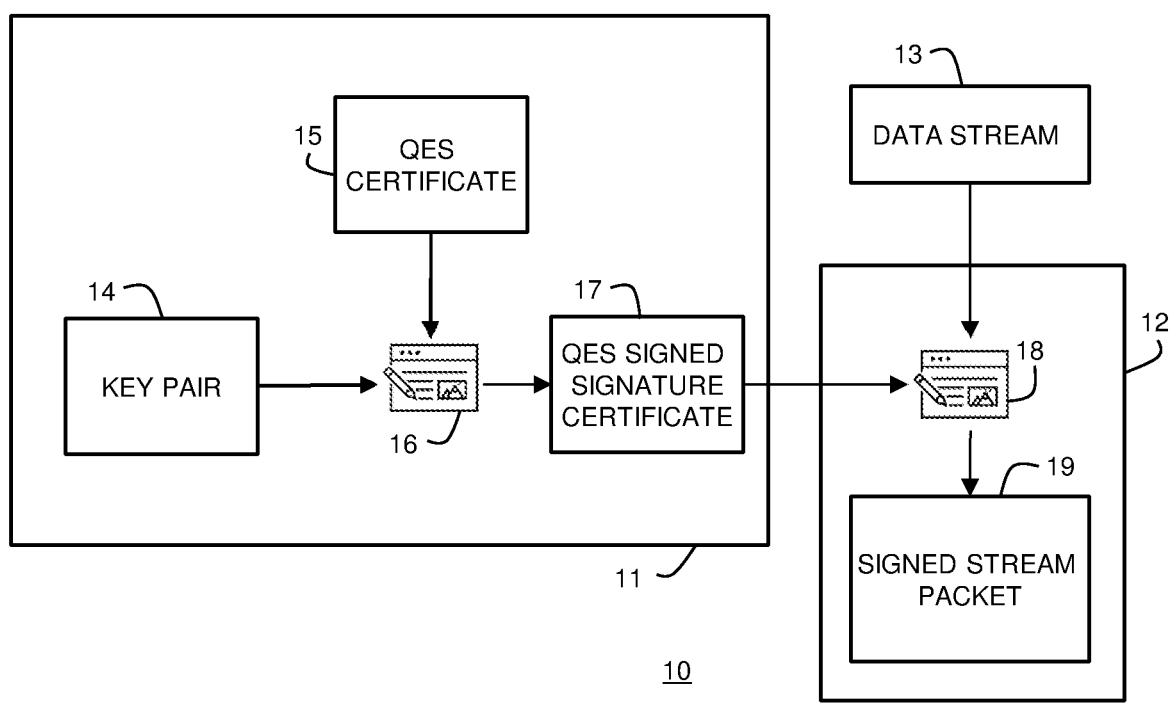
FIG. 1 illustrates a system to create a signature certificate for signing a data stream according to an embodiment.

Generally, there is provided, a method to create a signature certificate that can be used to sign a data stream to allow verification of the authenticity of the data stream. In one embodiment, the signature certificate is created using a digital certificate and a key and then storing the signature certificate in a secure element of a recording device for capturing the data stream. Further, the method may be used to link a digital identity of a natural person, for example, a digital identity issued by the state as part of a national identification (ID) card, to a digitized output data stream. In one embodiment, the digital identity of a person may be linked to, e.g., digital audio data such that a consumer of this audio data is able to verify its authenticity through cryptographic signing methods. For example, a digital certificate, such as a qualified e-signature (QES) certificate may be combined with a cryptographic key to create a signature certificate that can then be used to sign the data stream. The data stream may include, e.g., one or more of digitized audio, video, or photographic content. The signature certificate may be stored as metadata with the data stream or stored separately and used to identify the source of the data stream. The cryptographic key is controlled by the owner or originator of the data stream.

In accordance with an embodiment, there is provided, a method including: generating a key; receiving a digital certificate; creating a signature certificate using the digital certificate and the key; storing the signature certificate in a secure element of a recording device; and receiving a data stream by the recording device and signing the data stream with the signature certificate. The digital certificate may be a qualified e-signature (QES) certificate provided by an eSign application of an electronic identification, authentication and trust services (eIDAS) token. Creating the signature certificate from the QES certificate and the key may further include signing the key with the QES certificate in a provisioning device. The method may further include: generating a hash of the signature certificate by the provisioning device; communicating the hash of the signature certificate to the eIDAS token by the provisioning device; signing, by the eIDAS token, the hash of the signature certificate to create a signed signature certificate; storing the signed signature certificate in the secure element of the providing device; transferring the signed signature certificate from the provisioning device to the recording device; and using, by the recording device, the signed signature certificate to sign the date stream. The eIDAS token may include a near field communication (NFC) interface for communicating with a NFC interface of the provisioning device. The key is a private key of an asymmetric key pair. The method may further include using a public key of the asymmetric key pair to verify the authenticity of the data stream. The recording device may perform the verification of the authenticity of the data stream. The data stream may include one or more of audio, photo, and video information. The provisioning device may be a smartphone, and the recording device may be one of a photographic camera, headset, video recorder, or diagnostic equipment.

In another embodiment, there is provided, a method for verifying an authenticity of a data source, the method including: generating a key pair; receiving digital certificate; combining a private key of the key pair with the digital certificate to create a signature certificate; generating a hash of the signature certificate; signing, by a certificate authority, the hash of the signature certificate; storing the signed and hashed signature certificate in a secure element of a recording device; receiving a data stream of the data source, by the recording device, and signing the data stream with the signed and hashed signature certificate; and using a public key of the asymmetric key pair to verify the authenticity of the data stream. The recording device may be one of a photographic camera, headset, video recorder, or diagnostic equipment. The data stream may include one or more of audio, photo, and video information. The signed and hashed signature certificate may be communicated from a provisioning device to the recording device via a near field communication (NFC) interface. The provisioning device may be a smartphone. The method may further include storing the signed and hashed signature certificate in a trusted execution environment of the provisioning device. The signed and hashed signature certificate may be stored as metadata of the data stream. The signed and hashed signature certificate may be stored separately from the data stream. The digital certificate may be a qualified e-signature (QES) certificate. The certificate authority may be an electronic identification, authentication and trust services (eIDAS) token.

The European Union provides online authentication through a national identity card implemented according to an electronic identification, authentication and trust services (eIDAS) token, referred to as an eIDAS token. In an embodiment, the eIDAS token is used to sign a key pair that is then used to sign data packets of a media stream such that they are bound to the eIDAS token of the speaker. A signature certificate is created that is used to sign the data packets. This signature certificate has to be cryptographically bound to the eIDAS token of the speaker. This newly created and legally signed signature certificate is securely stored in a secure element of a device. The signed signature certificate provides for data integrity and provides protection against modifications of a data stream, such as for example, audio or video. Also, hardware may be provided to allow for the continuous data signing of a series of packets.

The eIDAS token holds an embedded electronic signature application named the eSign application. The eSign application, when activated, holds the QES certificate. Using the eIDAS token, the creation of e-Signatures can only be carried out if it is backed by qualified certificates. These can only be issued by a qualified trust services provider (QTSP) who is supervised and confirmed as a European Trusted Provider (Qualified Electronic Signature Providers) via the EU Trusted List. Thus, the eIDAS token acts as a certificate authority to sign the signature certificate, which is then used to sign the data stream. The QES certificate of the eSign application has a limited life and must be renewed every few years. Because of this, the QES certificate of the eSign application itself is not best suited to be used as an entity to sign data directly. Therefore, according to an embodiment, the trusted QES certificate is used to sign a certificate based on a generated asymmetric key pair. Doing so, a local public key infrastructure (PKI) is created that binds the newly created key pair cryptographically to a trusted key chain of the QES certificate.

Note that the created signature certificate can be used to sign audio, video, digital photos, and other digitized data. The signature certificate does not have to be developed or customized for the type of information that is produced, and does not have to be meaningful and entertaining for people such as video, audio and photos. In addition to audio, video, and photos, the signature certificate can be applied to any type of sensor data in an industrial or medical setting.

FIG. 1 illustrates a system 10 to create a signature certificate for signing a data stream according to an embodiment. System 10 includes provisioning device 11 and recording device 12. Provisioning device 11 is used for creating and signing a signature certificate. A key pair 14 is created. Key pair 14 may be an asymmetric key pair that includes a private key and a public key. QES certificate 15 is used to sign 16 the private key of the key pair 14 to create a QES signed signature certificate 17. In another embodiment, a different certificate type may be used to sign the private key. The signature certificate 17 may then be used in a recording device 12 to sign data stream 13 received by recording device 12 to produce a signed data stream 19. In one embodiment, provisioning device 11 may be a smartphone and the process of creating and signing the signature certificate may be implemented in an app running on the smartphone with a trusted execution environment (TEE) and near field communication (NFC) interface. Recording device 12 may be any device that records data from the real world (e.g., video, photos, audio). For example, the recording device may capture an analog signal, perform an analog-to-digital transformation, and store a digitized version of the analog signal in a memory. Recording device 12 may include one or more integrated circuits (chips) that are responsible for the several actions required to capture data. In the case of an image, the analog capture may be performed by a set of lenses and a photo-sensitive element which helps to transform light intensity and wavelength into a digital form. Then a microcontroller may transform a raw digital data into a special file format (such as jpeg) that can be written to a memory of recording device 12.

Using a signed signature certificate has at least two advantages. For example, the eIDAS token does not need to be used for the actual data signing process. Also, the signed signature certificate can be retained and reused even though the eIDAS token or its QES certificate has to be renewed.

Figure 2:
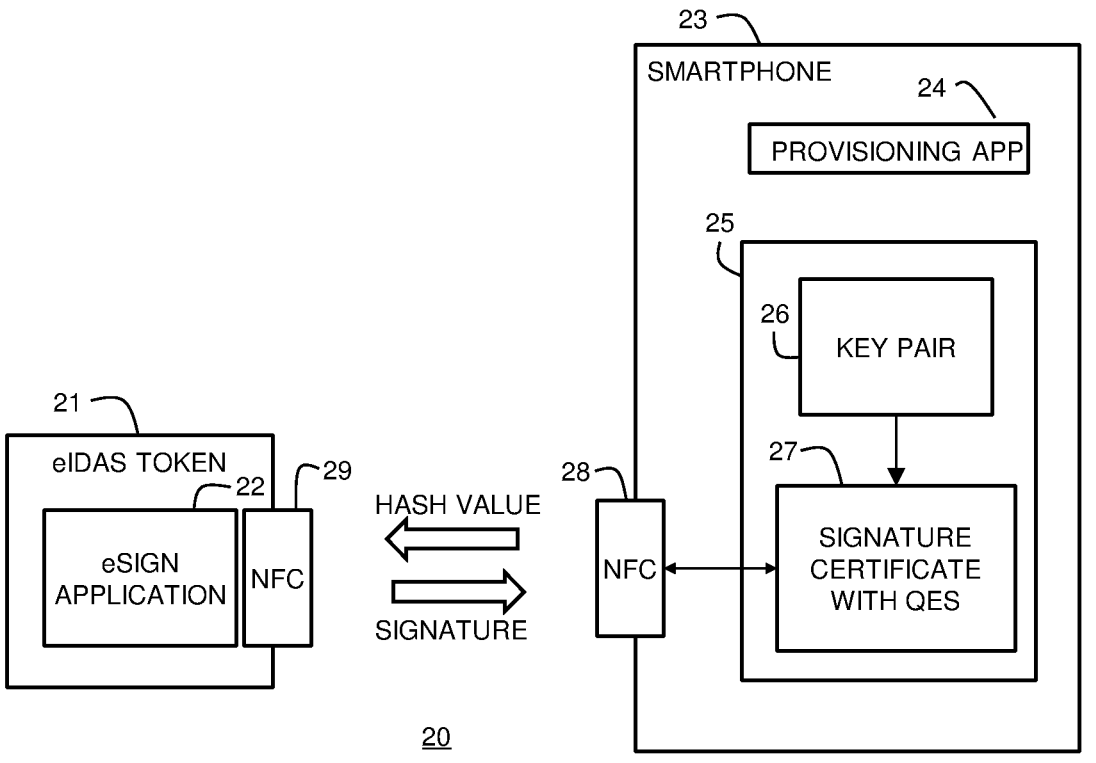
FIG. 2 illustrates a smartphone in communication with an eIDAS token to sign a signature certificate in the smartphone in accordance to an embodiment.

FIG. 2 illustrates smartphone 23 in communication with eIDAS token 21 to sign a signature certificate in the smartphone in accordance to an embodiment. Smartphone 23 functions as a provisioning device. The eIDAS token 21 includes eSign application 22 and NFC circuit 29. In one embodiment, the eIDAS token 21 may be a smartcard. Smartphone 23 includes provisioning application 24, TEE 25, and NFC circuit 28. TEE 25 has relatively better security than a rich execution environment (REE) (not shown). Key pair 26 and signature certificate with QES certificate 27 are stored within TEE 25. NFC circuits 28 and 29 are used to interface provisioning app 24 running on smartphone 23 to eSign application 22 of eIDAS token 21. Under the direction of provisioning application 24, signature certificate 27 is created in TEE 25 based on a generated asymmetric key pair 26 as described above regarding FIG. 1. A hash value of the signature certificate is calculated in TEE 25 and communicated via NFC to eIDAS token 21. This hash value is then sent to eSign application 22 of eIDAS token 21 where a signature certificate is created using the internally stored and state approved QES certificate. The signature certificate with QES 27 is then sent back to smartphone 23 where it is stored in a memory of TEE 25. Provisioning app 24 receives the calculated signature certificate 27 in return for the hash value, and appends the hash value to the end of the signature certificate with QES 27.

Figure 3:
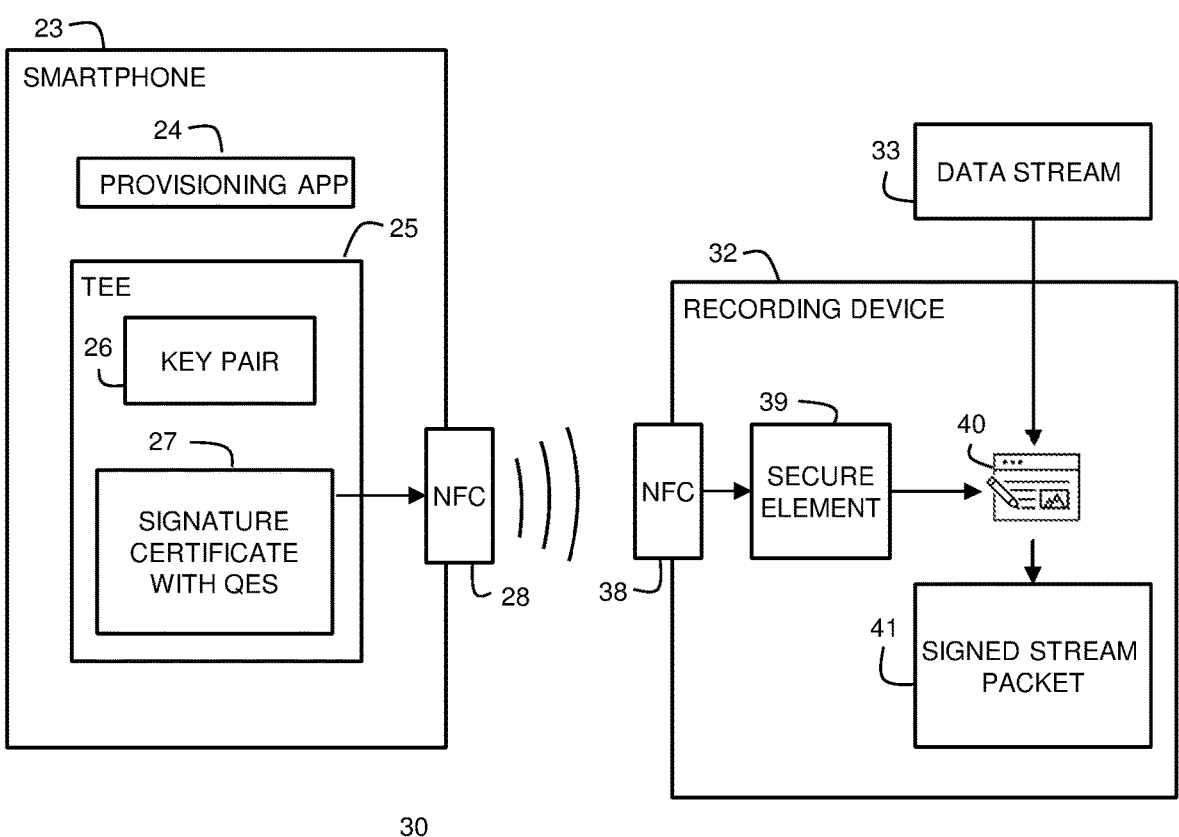
FIG. 3 illustrates a smartphone transferring the signed signature certificate of FIG. 2 to a device according to an embodiment.

FIG. 3 illustrates smartphone 23 of FIG. 2 transferring signed signature certificate 27 to recording device 32 according to an embodiment. After creating signed signature certificate 27, the signed signature certificate 27 is transferred to recording device 32 via NFC circuit 28. Recording device 32 receives signed signature certificate 27 through NFC circuits 28 and 38 and is stored securely in a memory of secure element 39. Secure element 39 is provided not only for securely storing signature certificate 27 but also to include hardware based cryptography. In one embodiment, secure element 39 can be powered just by using the NFC field of smartphone 23. Therefore, a secure connection using secure messaging (SM) can be established between smartphone provisioning app 24 and secure element 39 to securely store signature certificate 27 in secure element 39. Once the certificate transfer is done, smartphone 23 is no longer needed and can be put away. Signature certificate 27 is then used to sign 40 the data steam 33 to create signed data steam 41.

From the user perspective the process illustrated in FIG. 2 and FIG. 3 to create signed signature certificate 27 may include: start provisioning app 24 on smartphone 23; position eIDAS token 21 in proximity to NFC interface 28 upon request for certificate signing; and hold NFC interface 38 of recording device 32 close to smartphone 23 until certificate update of signature certificate 27 in secure element 39 is done. This description assumes that the eSign application 22 of eIDAS token 21 is in an operational state and 'activated'. Then, when necessary, the public key of key pair 26 can be used to verify that a data stream is an authentic data stream.

Figure 4:
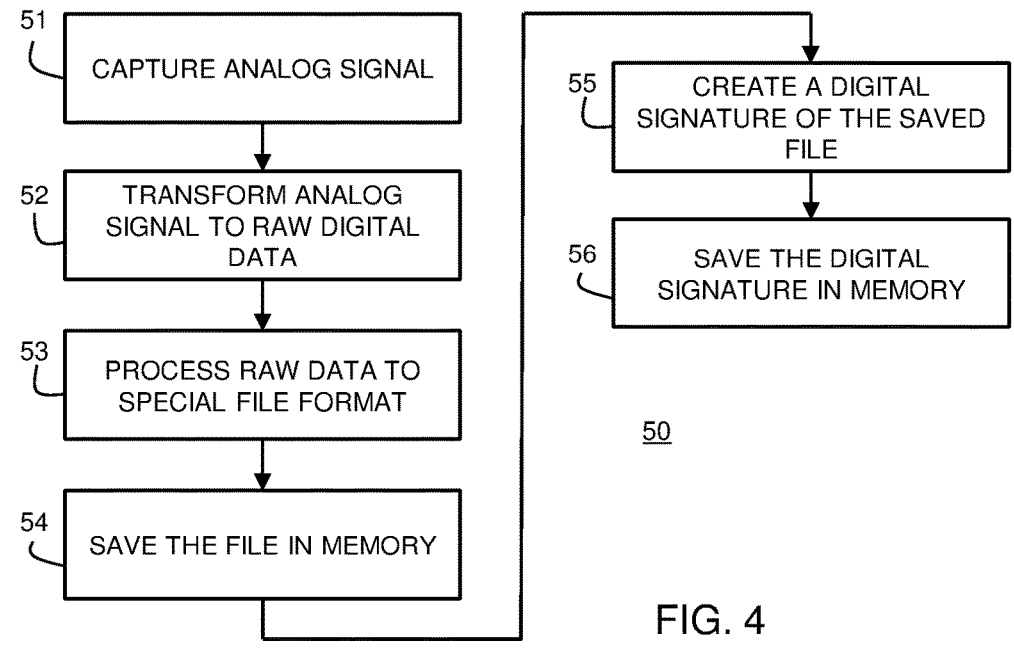
FIG. 4 illustrates a method for capturing a data stream according to an embodiment.

FIG. 4 illustrates method 50 for capturing a data stream according to an embodiment. Method 50 begins at block 51. At block 51, an analog signal is captured by a recording device such as camera optics, a microphone, or other sensor data. At block 52, the analog data signal is converted to a raw digital data signal. This may be done using an analog-to-digital converter. At block 53, the raw data signal is processed to a specific file format. At block 54, the data file is saved in a memory of the recording device. Note, that some blocks of the method can be mixed or run in parallel with other blocks. For example, it is possible that the processing of raw data into a specific file format (such as jpeg) is interleaved with the writing of the file into the memory. It is also possible that a recording device creates several files corresponding to the same photo, for example, the raw data may be saved in addition to the data saved in a specific file format such as jpeg. At block 55, the image file is processed using a cryptographic function to create a digital signature. At block 56, the digital signature is stored in memory. Blocks 55 and 56 may be implemented as described above in FIG. 1-FIG. 3, or block 55 and 56 may be implemented in a number of different ways. For example, the cryptographic function can be either a digital signature scheme such as based on public key cryptography, e.g., RSA (Rivest-Shamir-Adleman) or it can be a symmetric cryptographic scheme such as hash-based message authentication code (HMAC). Note, that in case of public key cryptography, a verification key may be published and thus anyone would be able to check if a data stream comes from a given recording device. In the case of HMAC, only the recording device itself would be able to confirm that a file was recorded by it. Both approaches have advantages and disadvantages depending on the application.

Storage of the digital signature can be done as a separate file or the digital signature can be saved in the file with the data stream as metadata. Note, that in the case a photo, there is just one signature for the photo, while in the case of a long stream of data such as video or audio, the signature can be added to each frame, block or portion of the file (e.g., one signature per minute of recorded audio). In addition, to verifying that data came from a specific data source, e.g., from a specific person using an ID token belonging to the person, the system may be used to verify that data came from a specific recording device.

Figure 5:
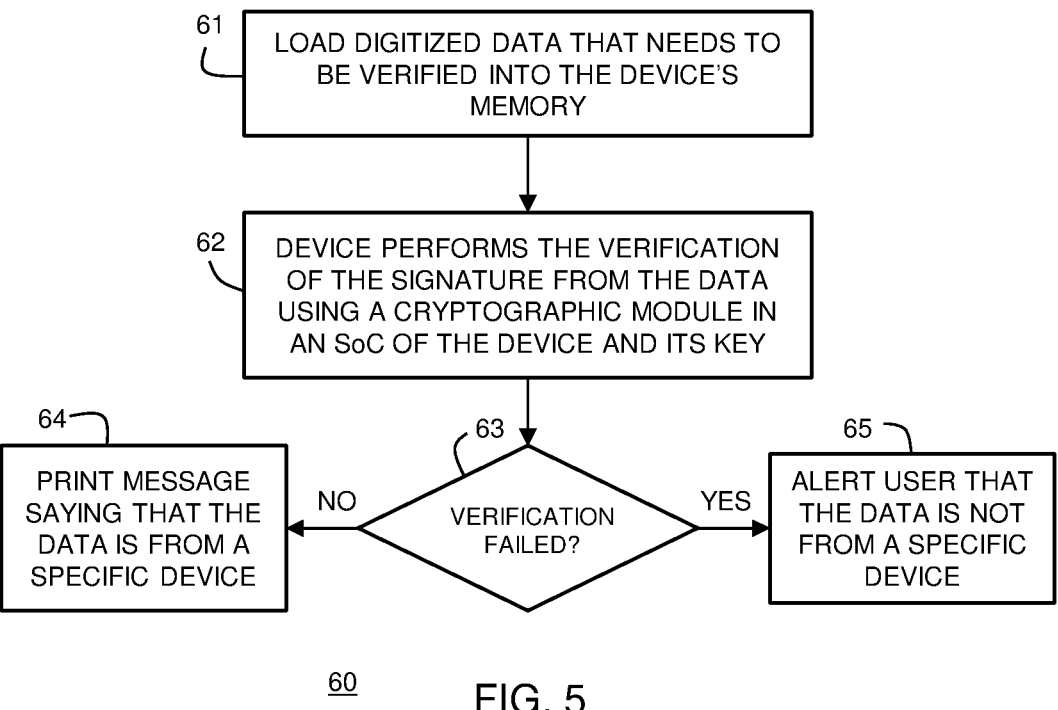
FIG. 5 illustrates a method for verifying a data stream according to an embodiment.

FIG. 5 illustrates method 60 for verifying that a digitized data stream came from a recording device according to an embodiment. In one embodiment, as shown in block 61, a file that is desired to be verified is input into the recording device. At block 62, the recording device performs the verification using the public key of the key pair created in FIG. 1 using cryptographic circuitry of a processor, such as a system-on-a-chip (SoC), of the device. In one embodiment, the digital signature is stored in the image file as metadata or as a watermark. If the digital signature is stored in a separate file then it can be provided to the recording device at the same time as the data file to be verified. At decision block 63, it is determined if the data file is authentic. If YES, one possible action may be for the device doing the verification to output a message saying the data is authentic data from a specific device as shown at block 64. If the data file is not authentic, that is, not from the expected data source, then a message may be output indicating that the data is not from the specific device.

In another embodiment, instead of only one key pair, multilevel keys may be used to make a system more robust against problems by allowing, e.g., the ability to prove which device or type of device was used. For example, in the case of a stolen device that still has the key/certificate inside, the use of an additional specific key can be enabled using a PIN, password and/or biometrics. One device can have several keys that are used for signatures and verifications. For example, in a system used to verify that a data stream came from a specific recording device, one key can be a device key, meaning that it comes from, e.g., a physical unclonable function (PUF) in the device. A second key can be shared among all devices of the same type, e.g., all photo cameras of the same model produced in the same year in the same factory. Another key can be related to all photo cameras of a specific model (from all factories and any year). Yet another key embedded in the device can be related to all products made by the same manufacturer. In this example, four different keys are suggested, in another example embodiment, there can be more or less than four keys. This way, any device from the same manufacturer will be able to verify an input (such as a photo) to a different degree of certitude, and thus produce an output such as, "This photo is made by a device made by the same manufacturer and by the device of the same model but not by the one that is used to make the verification".

In another embodiment, the device can generate a pair of cryptographic keys using the randomness that comes from a PUF in the device. The public key can be published in a cloud service of the device manufacturer or any other publicly available similar service such as a key-server (like a key server used in GNU privacy guard (GPG) or pretty good privacy (PGP) system). The public key can also be published in a blockchain to ensure integrity of the chain of records. In such case any person who has a record that they want to verify can access the service containing the public keys of devices, find the device by its ID and perform the verification either by downloading the public key and performing the verification on their computer or by submitting a file (that requires verification) to the public service that will do the verification in the cloud. The ID of the device can be published together with the key in a public repository and it can also be attached to the file that is produced by the device as metadata. Note, that both techniques can be combined together for additional robustness of the system.

If a device has multiple symmetric keys that are embedded in the device by the manufacturer (several devices have to know the same key) then the manufacturer would know the key and would potentially be able to cheat the system to some degree. However, its reputation will be ruined as soon as the cheating is discovered, the same type of issue is now present in the domain of certification authorities whose business is keeping some keys secret and signing identities of other parties.

If a data file is modified, resized or cut into parts then the original device would not be able to check its validity. The full file has to be provided. It is possible to partially cope with this issue. Instead of signing the entire file the device can produce several signatures of its parts. Moreover, in case of a copyright dispute to find out who is the original author, the owner of the original device and record can provide the full (non-modified version of a file).

There is another way of implementing the same functionality i.e., functionality that can be used to verify if a record was created by it. It can be done through the use of a large secure storage. The idea consists of storing a copy of each file that is recorded by the device in an internal secure memory that cannot be erased or modified from the outside. Such an approach would require an enormous amount of memory thus, instead of storing actual files it is possible to store a compressed, hashed version of each file (e.g., only 256 bits per file). Such approach (storing hashes) would still require an internal secure memory in the SoC but a much smaller one would be suitable. In this case there is no need for the secret key in the SoC and there is no need to save a digital signature in the file, only a hash can be stored in the device itself and used during verification. If the hash for the verified file exists in the camera, then the image was taken by the camera.

Figure 6:
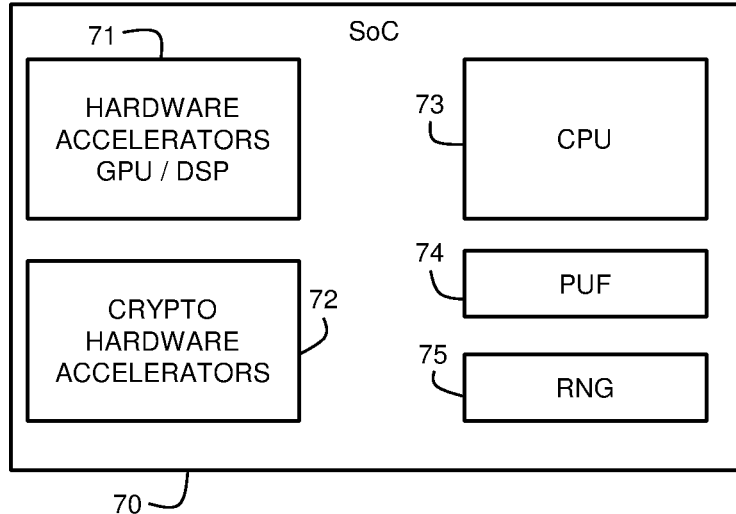
FIG. 6 illustrates a system on a chip (SoC) in accordance with an embodiment.

FIG. 6 illustrates a simplified system on a chip (SoC) 70 in accordance with an embodiment. SoC 70 includes hardware accelerators 71, cryptographic hardware accelerators, central processing unit (CPU) 73, PUF circuit 74, and random number generator circuit 57. The hardware accelerators may including one of more graphics processing units (GPUs) and/or digital signal processors (DSPs). SoC 70 may be implemented in a recording device, or other device, for performing the methods of verifying the authenticity of a data source.

As an example, photo-camera uses hardware accelerators 71 such as GPU and DSP to create images from the data that is captured. Crypto hardware accelerator 72 is provided for executing cryptographic algorithms, such as for example, digital signature or MAC processes. Physical unclonable function 74 and RNG circuitry 75 is used in cryptographic operations. PUF 74 may be used to generate cryptographic keys, such as key pairs 14 and 26. The same PUF would always generate the same key while the use of different PUFs may be used to generate different keys that could be used for added security.

Note that cryptographic algorithms may be implemented in software/firmware of the device, but it would make it much slower and might not fit in the time-constraints for the application (e.g., it would take too long to take one photo with a camera). It is important that different recording devices have different cryptographic keys. However, generating identical keys is highly unlikely if PUFs are used. In one embodiment, a processing SoC contains the cryptographic components as well as the components to process the raw inputs so that it would be extremely difficult to make the cryptographic component to sign raw data that does not come from the chip itself. The key can also be extracted from the PUF once and then stored in a special secure memory or in a secure element. In one embodiment, the PUF cannot be read or accessed from outside of the chip. This way, the generation and the source of cryptographic keys will be completely contained in the SoC, preferably inside the secure element.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method comprising:
   generating a key;
   receiving a digital certificate;
   creating a signature certificate using the digital certificate and the key;
   storing the signature certificate in a secure element of a recording device; and
   receiving a data stream by the recording device and signing the data stream with the signature certificate.

2. The method of claim 1, wherein the digital certificate is a qualified e-signature (QES) certificate provided by an eSign application of an electronic identification, authentication and trust services (eIDAS) token.

3. The method of claim 2, wherein creating the signature certificate from the QES certificate and the key comprises signing the key with the QES certificate in a provisioning device.

4. The method of claim 3, further comprising:
   generating a hash of the signature certificate by the provisioning device;
   communicating the hash of the signature certificate to the eIDAS token by the provisioning device;
   signing, by the eIDAS token, the hash of the signature certificate to create a signed signature certificate;
   storing the signed signature certificate in the secure element of the providing device;
   transferring the signed signature certificate from the provisioning device to the recording device; and using, by the recording device, the signed signature certificate to sign the date stream.

5. The method of claim 4, wherein the eIDAS token comprises a near field communication (NFC) interface for communicating with a NFC interface of the provisioning device.

6. The method of claim 1, wherein the key is a private key of an asymmetric key pair.

7. The method of claim 6, further comprising using a public key of the asymmetric key pair to verify the authenticity of the data stream.

8. The method of claim 7, wherein the recording device performs the verification of the authenticity of the data stream.

9. The method of claim 1, wherein the data stream includes one or more of audio, photo, and video information.

10. The method of claim 1, wherein the provisioning device is a smartphone, and the recording device is one of a photographic camera, headset, video recorder, or diagnostic equipment.

11. A method for verifying an authenticity of a data source, the method comprising:

generating a key pair;

receiving a digital certificate;

combining a private key of the key pair with the digital certificate to create a signature certificate;

generating a hash of the signature certificate;

signing, by a certificate authority, the hash of the signature certificate;

storing the signed and hashed signature certificate in a secure element of a recording device;

receiving a data stream of the data source, by the recording device, and signing the data stream with the signed and hashed signature certificate; and using a public key of an asymmetric key pair to verify authenticity of the data stream.

12. The method of claim 11, wherein the recording device is one of a photographic camera, headset, video recorder, or diagnostic equipment.

13. The method of claim 11, wherein the data stream includes one or more of audio, photo, and video information.

14. The method of claim 11, wherein the signed and hashed signature certificate is communicated from a provisioning device to the recording device via a near field communication (NFC) interface.

15. The method of claim 14, wherein the provisioning device is a smartphone.

16. The method of claim 14, further comprising storing the signed and hashed signature certificate in a trusted execution environment of the provisioning device.

17. The method of claim 11, wherein the signed and hashed signature certificate is stored as metadata of the data stream.

18. The method of claim 11, wherein the signed and hashed signature certificate is stored separately from the data stream.

19. The method of claim 11, wherein the digital certificate is a qualified e-signature (QES) certificate.

20. The method of claim 11, wherein the certificate authority is an electronic identification, authentication and trust services (eIDAS) token.

* * * * *